July 11, 1967  L. C. ROCKWELL ETAL  3,330,166

GEAR UNIT

Filed Feb. 16, 1965  2 Sheets-Sheet 1

INVENTOR
LEONARD C. ROCKWELL
BY RICHARD E. SEEGER

Toulmin & Toulmin

ATTORNEYS

United States Patent Office 3,330,166
Patented July 11, 1967

3,330,166
GEAR UNIT
Leonard C. Rockwell and Richard E. Seeger, Wilmington, Ohio, assignors to National Gear Corporation, Wilmington, Ohio, a corporation of Ohio
Filed Feb. 16, 1965, Ser. No. 432,961
4 Claims. (Cl. 74—421)

In certain types of mechanisms, particularly those which involve gear trains, close vertical and horizontal alignments of the gear shafts are necessary in order to avoid excessive friction and noise.

Floor scrubbing and polishing machines which usually employ vertically disposed gear shafts and bearings are prone to be noisy on account of loose rubbing fits and the weight of parts bearing down on the various support surfaces.

In the case of these machines which bear against the floor being treated it is practically a necessity that the brush will press with sufficient force to do the job and yet, the various parts of the machine, including the rotary portions which give rise to this desirable weight, can add greatly to the friction encountered between the parts. This friction, with its attendant wear, may result in noisy operation, and the latter is enhanced if there is the slightest misalignment or misplacement between the various shafts and bearing surfaces.

Due to the complexity of the assembly of the parts into a compact space, it has been the practice to build the housing or carrier out of a number of parts screwed or bolted together which accommodate one or more of the bearing supports. Notwithstanding the care taken in the machining operation to provide proper alignment and position between these supports, it has been found that it is practically impossible to obtain minute tolerances in position and alignment as would prevent excessive wear and noise between the fast moving gears.

While such noise is objectionable in all kinds of gear transmissions as indicating undue friction, it is particularly undesirable in appliances such as floor polishing or scrubbing machines since these appliances are being operated in homes, hospitals, schools, and offices and business establishments where excessive noise can be very irritating to people trying to sleep, convalescing, studying, or working.

The primary object of the invention is to provide a mechanism including a series of gears interposed between input and output shafts and in which the gears are permanently and accurately aligned within minute tolerances.

Another object is to provide a gear mechanism, including input and output shafts normally operable in the vertical direction, so that the weight of the gears and shafts is exerted downwardly and in which the positional relationship of the gears, both horizontally and vertically, is maintained within such close limits that friction and force, which usually accompany weight, is substantially avoided.

Still another object is to provide a compact floor scrubber and/or polisher employing a reduction gear ratio and in which the gears are so accurately aligned and positioned as to reduce friction and noise to a minimum.

The more general object is to provide a gear transmission system that has general use, but more particularly is adapted in a reduction ratio form as applied to floor scrubbers and polishers, and in which the position and alignment of the various gears and their supporting surfaces are machined to such close tolerances that there is substantially little or no friction between the meshing elements.

The above objects are attained in brief by providing a heavy metal housing of integral character of a shape and size as to contain all of the bearings and gears and other rotating parts, and these bearings and surfaces can be accurately determined by a machining operation which cuts to an extremely close tolerance. This matrix is preferably constituted of cast iron so that the positions of the bearings, when they have been accurately determined, preferably by automatic machine work, are absolutely fixed.

Other objects and features will be apparent as the specification is perused in connection with the accompanying drawings in which.

Figure 3:
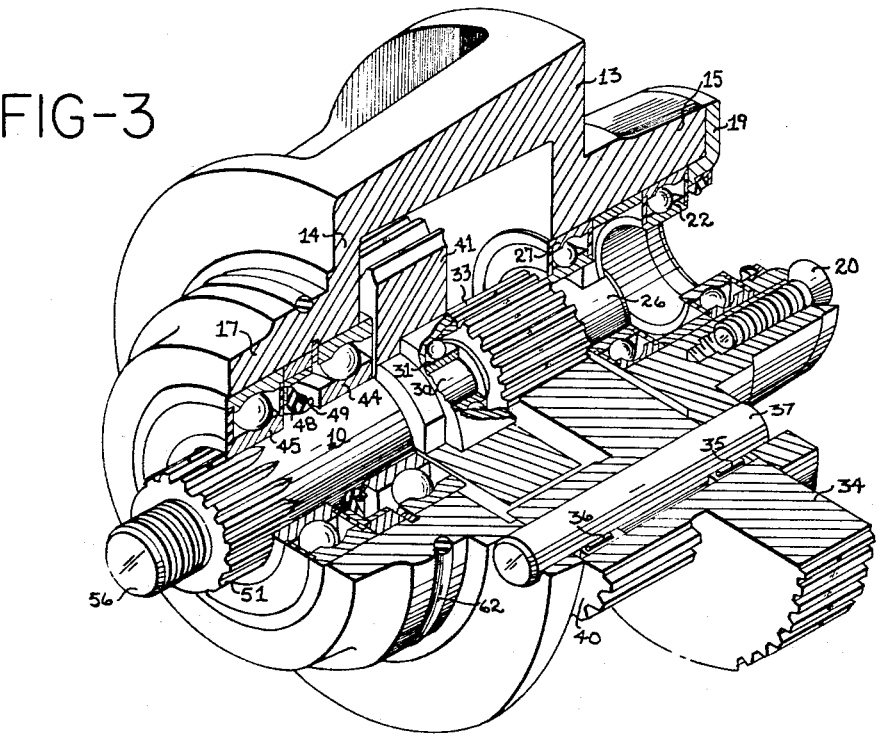
Figure 4:
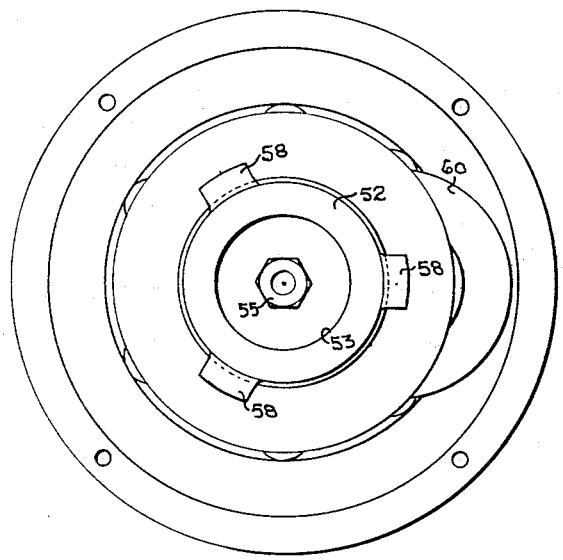

FIGURE 3 depicts a longitudinal perspective view of the gear assembly and surrounding metal housing separated from the floor scrubbing accessories. A right angle section is cut away to show the interior parts of the mechanism; and FIGURE 4 depicts a plan view of the improved unit and surrounding housing taken along line IV—IV of FIGURE 1 but in smaller size and looking in the direction of the arrows.

Figure 1:
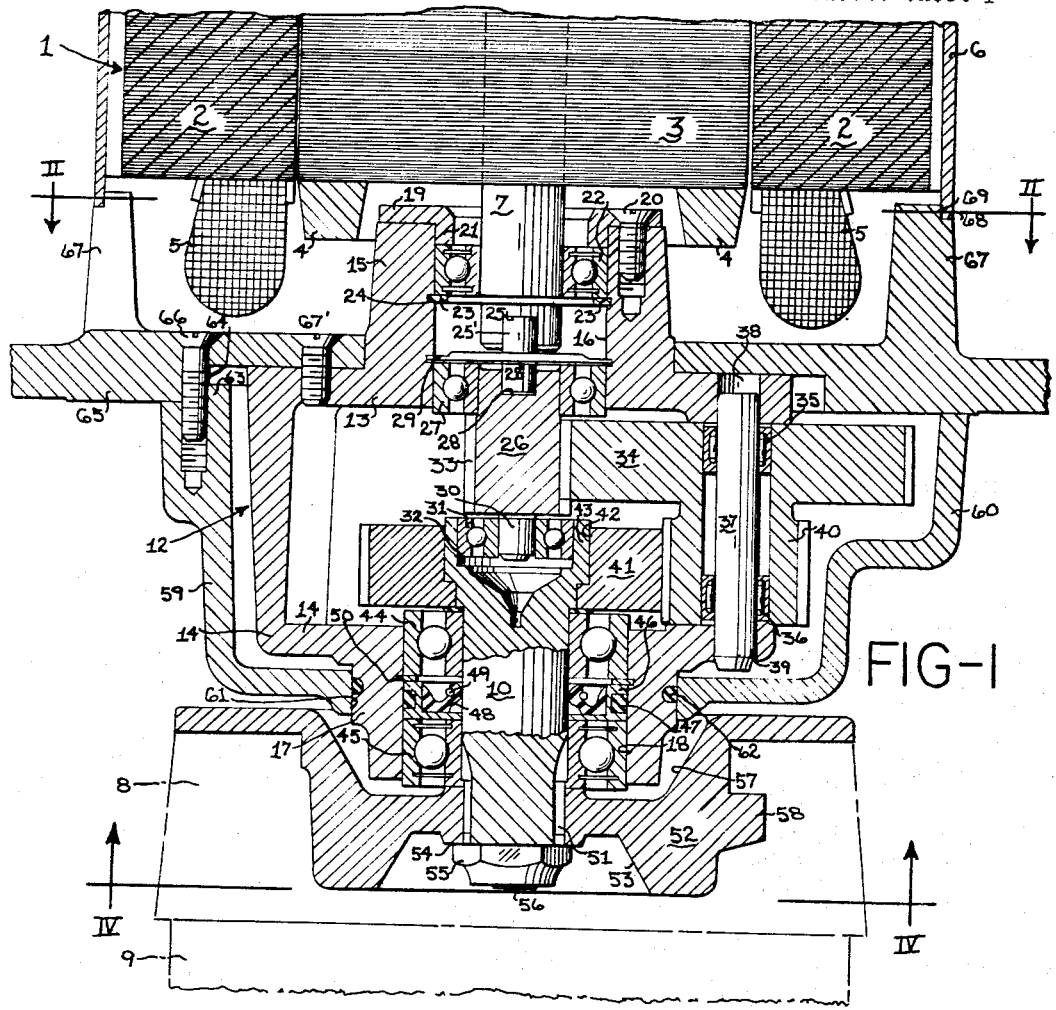
FIGURE 1 represents a vertical cross sectional view through the improved gear mechanism as applied to a floor scrubber.
Figure 2:
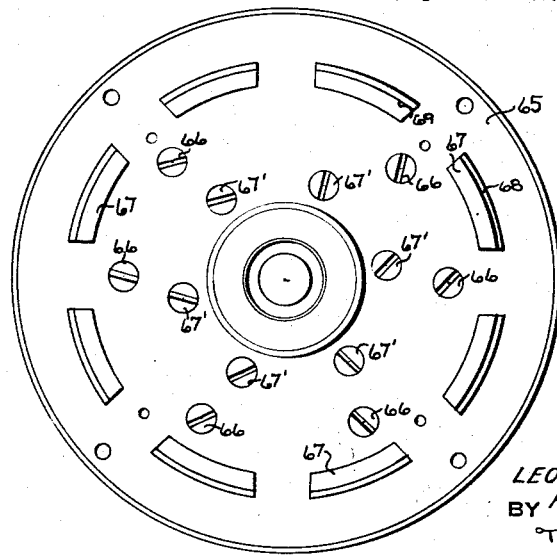
FIGURE 2 is a plan view somewhat in miniature and taken along the line II—II in FIGURE 1 looking in the direction of the arrows.

Referring more particularly to FIGURE 1 reference character 1 generally designates a vertical motor having a laminated stator 2 and surrounding a rotor 3 having downwardly projecting lugs 4 which serve as a fan. The end winding of the motor is indicated in 5. The motor is of a conventional type so that the upper end need not be illustrated. A motor housing 6 surrounds the outside surface of the laminations. The shaft of the motor is indicated at 7 and as seen in FIGURE 1 extends downwardly into a gear transmission mechanism which will be described in detail.

At the lower end of FIGURE 1 there is indicated in phantom a circular brush holder 8 containing bristles diagrammatically indicated at 9 and held within the holder 8 in any suitable and well known manner. The lower ends (not shown) of these bristles contact the floor in a circular scrubbing or polishing action when electrical energy is applied to the motor 1. The latter is usually run at a speed of 1800 r.p.m., and it is desirable that the brush and holder should run at a considerably lower speed such as 200 r.p.m. in order to reduce the danger attendant on the operation of the machine as much as possible.

The general purpose of this invention as brought out by the objectives mentioned hereinbefore is to provide a suitable transmission unit employing gears having a reduction ratio so that the input shaft rotating at 1800 r.p.m. will cause rotation of the output shaft 10 at a suitable brush speed with little or no noise and therefore with a minimum friction and wear between the various rotating parts.

Construction of the gear retaining housing

In accordance with one of the aspects of our invention all of the gears and supporting surfaces therefor and shafts are contained within an integral cast housing or matrix indicated generally at 12. This housing is formed with a top plate 13 and a bottom plate 14 with three ribbed columns interconnecting the top and bottom plate members and arranged in a circular formation about the peripheries of the plates 13, 14. The upper plate member 13 is provided with an upstanding hub 15 having an internal diameter as indicated at 16 considerably greater than the diameter of the input shaft 7 for purposes which will presently be explained. Likewise, the lower plate 14 is provided with a downwardly extending hub member 17 provided with an internal bore as indicated at 18 which is considerably greater than the diameter of the output shaft 10.

There is a flanged member 19 extending across the upper surface of the hub 15 and secured thereto by a series of screws 20. The member 19 has a downwardly extending portion 21 which fits snugly within the diametric bore 16. Abutting the lower edge of the depending portion 21 there is a ball bearing carrier 22, the outer race of which fits snugly within the bore 16 and the inner race bears lightly against the shaft 7. The carrier is held in position at the bottom by means of a snap washer 23 which fits into an annular groove 24. The washer 23 has an internal diameter such that the body of the washer will rest solely against the outer race of the ball bearing carrier. The shaft 7 is thus journalled within the ball bearings and extends past the washer into the interior of the hub member 15.

The shaft is provided at its lower end as indicated with a slot 25. Directly below the shaft 7 and aligned therewith is an intermediate shaft 26 which is journalled at the upper end in a ball bearing carrier 27 of which the outer race is secured to the bore of the hub member 15 and the inner race contacts the shaft.

The upper end of the intermediate shaft 26 is provided with a downwardly extending slot 28 which is directly in line with the slot 25 of the upper shaft. The outer race of the carrier 27 is held in position, at the top, within the bore 16 by means of a snap washer, the same as 23. The inner race is held in position, at the bottom, by means of a shoulder on shaft 26. Shaft 7 and shaft 26 are coupled by means of a coupling consisting of thin steel plates molded together with neoprene or other oil resistant material and extending into slot 25 of shaft 7 and slot 28 of shaft 26 so that rotation of shaft 7 will cause the intermediate shaft 26 to rotate.

The extended end 30 of the intermediate shaft 26 is journalled against the inner race of a ball bearing carrier 31. The outer race of the carrier rests in a countersunk bore of an enlarged portion indicated at 32 of the lower or output shaft 10. Thus the upper end of the intermediate shaft 26 is journalled in the carrier 27 and the lower end is journalled in the carrier 32 through the extension 30. There is no direct connection between the intermediate shaft 26 and the output shaft 10 except through the gear train which will be presently described.

Gear train

The shaft 26 is provided at its center with spiral teeth 33 forming a helical gear of relatively small diameter. These teeth mesh with the teeth of a gear 34 of large diameter which is supported on a pair of roller bearings 35, 36 and a stationary rod 37, the upper end of which is fixedly contained in an opening 38 in the upper plate 13 of the housing 12, and the lower end is fixedly contained in an opening 39 at the lower plate 14 of housing 12.

Integrally joined to the gear 34 there is another gear 40 of smaller diameter than gear 34, so that both gears 34 and 40 can freely rotate on the roller bearings 35, 36. Meshing with the smaller gear 40 there is a helical gear 41 of larger diameter than the gear 40. This gear 41 is provided with a stepped bore 42 for receiving an enlarged collar portion 43 of the output shaft 10. The gear 41 is secured to this shaft portion in any suitable and well known manner so as to rotate the shaft 10 when the gear is turned.

The output shaft 10 is journalled by means of two ball bearing carriers indicated at 44, 45, the outer race of both being fixedly contained in the bore 18 of the lower hub member 17. The inner race of each carrier bears directly against the shaft 10. The carriers are maintained at their proper respective positions within the bore 18 by means of a spaced member 46 having an external rubber seal 47 and provided with an internal rubber expanding seal 48 which is caused to bear against the shaft by means of a compression ring 49. A snap ring 50 is also employed between the adjacent outer races of the carriers 44, 45. Thus, the lower or output shaft 10 is carried on the ball bearings 44, 45 and are caused to rotate whenever the gear 41 rotates.

The lower end of the shaft 10 is provided with longitudinally extending teeth indicated at 51 which are caused to mesh with corresponding teeth provided around the inner bore of a brush retaining plate 52. This plate has a reentrant bore indicated at 53 provided with a flat machined surface 54 for receiving a nut 55 which holds the brush retaining plate 52 at the end of the output shaft 10. This plate is provided with a toothed bore, the teeth of which engage the teeth of the shaft. The latter extends into a threaded portion 56 which receives the nut.

The brush retaining plate 52 is provided with a reentrant or well portion 57 for receiving the lower hub 17 of housing 12 and also the lower ball bearing carrier 45. The plate 52 is provided with three or more transversely extending lugs 58 which cooperate with similar lugs provided on the brush holder 8 in such a way that the holder can be pushed past the metal lugs 58 and then turned to have the corresponding lugs on the holder lock with the metal lugs and thereby secure the holder and its brush against the retaining plate 52 for rotation when the output shaft 10 is rotated in the manner which will be described presently. However, brush drivers of other designs are, and may be employed.

*The operation of the mechanism described up to this point*

When the motor 1 is energized in any well known and suitable manner the rotor 3 is caused to rotate as well as the input shaft 7, because they are keyed together. Due to the coupling with plates extending into slots 25 and 28 the intermediate shaft 26 is caused to rotate at same speed as shaft 7, which in turn causes the gear 34 to rotate at a slower speed, depending on the ratio of the number of teeth of the respective rotating elements 26, 34. The roation of the gear 34 causes the gear 40 to which it is integrally joined to rotate at the same speed. Rotation of the gear 40 causes the gear 41 to rotate at a slower speed due to the greater number of teeth on the gear 41 as regards the teeth on the gear 40.

Rotation of the gear 41 is communicated to the output shaft 10 which in turn causes the brush retaining plate 52 to rotate. It is apparent that there are two reductions in speeds, one reduction taking place between gears 26 and 34 and the second reduction between the gears 40 and 41. Assuming that the input shaft 7 is rotating at 1800 r.p.m. the output shaft will rotate at approximately 200 r.p.m., carrying the polishing or scrubbing brush 9 at a relatively slow and safe speed.

It will be noted that all of the shafts 7, 26, 10 and the various gears 34, 40, 41 derive their support through suitably positioned ball or roller bearings from a single housing 12. The latter is usually constituted of cast iron, and the various parts, walls, plate portions, and columns are of such thickness that there is no give to any particular part of the casting even though it is hollow and is open at many paces in order to provide the necessary room for the various rotating parts and their stationary supports.

This housing and the various bearing surfaces provided therein, both flat and round, for the support of the shafts and gears, can be machined to a few thousandths of an inch tolerance, preferably by an automatic machine closely adjusted so as to provide completely uniform dimensions and positions of the various round and flat surfaces on a quantity production basis. Thus, every shaft and gear is aligned and positioned to the minutest tolerance, which, in effect, reduces the amount of friction for the rotary effort of the shaft 7 in passing through the double reduction gearing to the output shaft 10. Not only is less heat evolved by this minimum friction, but what is more important is the fact that there is little or no noise caused by the complicated set of double reduction ratio gears.

The housing and all of the internal parts are operated in a bath of oil or grease in order still further to reduce friction, if any there be, and consequent noise, but more especially to increase the life of the machine.

For this purpose a completely enclosed casing 59, of any suitable material, is provided which closely surrounds the operating parts and is provided with an outwardly extending bulge indicated at 60 to accommodate the large gear 34. The lower portion of the housing 59 has a bore 61 which fits snugly about a machined exterior surface of the lower hub 17, and the latter is provided with an O-ring 62 which serves as an oil or grease seal. The upper part of the casing 59 is provided with a circular lip 63 which fits snugly into a recessed opening 64 of a support plate 65 which is screwed as indicated at 66 to thickened portions of the casing 59. Screws 67' are located at suitable positions about the plate 65 to attach the upper plate 13 of the matrix to the support plate 65. The latter is provided with a series of upstanding fairly thin bosses 67 arranged in a circular pattern and separated from one another. The upper surfaces of these bosses are provided with cutaway recesses 68 to form a ledge and leaving lips 69 for snugly but detachably receiving the inner surface of the motor housing 6. The motor or rather the housing can therefore be set down over the lips 69 and supported on the ledge 68 so as to bring the shaft 7 in line with the intermediate shaft 26, at which time the lugs 25', 28' will be forced into the recesses formed in the shafts, so that any movement of the shaft 7 will obviously cause the intermediate shaft 26 to move at the same speed.

It will be noted that the motor as a whole can then readily be lifted, when necessary, away from the gear transmission unit, and with equal facility can be positioned in place to rotate the unit upon energization of the motor.

From the foregoing it is evident that we have disclosed a gear transmission unit in which all of the critical dimensions, surfaces, shaft alignments and positions can be absolutely fixed by automatic machines on a quantity production basis and remain absolutely fixed by reason of the fact that all of these elements are contained and supported within and by a metal housing of the cast type which allows absolutely no give in any direction. When the positions of these rotating parts, surfaces and other operational elements are established initially to an extremely close tolerance, there is practically no friction developed between the parts, even though some of the latter are operating at a high speed of the order of 1800 r.p.m. The cast iron housing is of the character and shape as freely to allow the free access to all of the many ball bearing journals and surfaces, so that here again whatever little friction might be developed is susceptible to the greasing effects of the surrounding oil.

While we have described and shown the improved gear transmission unit as being a part of a floor polishing or scrubbing machine which is of the upright and therefore the least advantageous type from the standpoint of eliminating friction and noise, it will be understood that the feature of providing the housing for containing all of the various parts and made of a "non-give" metal, such as cast iron, can be used in horizontal gear transmission systems having both speed reduction and speed increase ratios and used in mechanism extending predominantly either in the horizontal or the vertical position.

It will be understood that this invention is susceptible to modification in order to adapt it to different usages and conditions and accordingly, it is desired to compre- hend such modifications within this invention as may fall within the scope of the appended claims.

What we claim is:

1. In an electrically operated floor working machine; a rigid one piece hollow cast metal housing, said housing including co-axial cylindrical bosses projecting from opposite ends thereof and having co-axial bores therein extending from outside the housing to the inside thereof, antifriction bearing means in said bores, input shaft means extending axially through one of said bores and supported on the bearing means therein, output shaft means extending axially through the other of said bores and supported on the bearing means therein, a gear on each said shaft means inside said housing and axially close to the pertaining said antifriction bearing means, a third shaft in said housing parallel to said input and output shaft means and spaced radially therefrom, a compound gear on said third shaft having respective parts meshing with the gears on said input and output shaft means, a drive motor having an end plate, said end plate having an aperture closely receiving the said boss through which said input shaft means extends and secured to said housing, said motor having an output shaft co-axial with said input and output shaft means and forming a part of said input shaft means, and an imperforate casing secured to said end plate of said motor and extending about said housing and having an aperture closely receiving the said boss through which said output shaft means extends and sealed to the said boss, said output shaft means comprising means on the end thereof which is outside said housing for mounting a floor working tool thereon and said means being closely adjacent the antifriction bearing means pertaining to said output shaft means.

2. A floor working machine according to claim 1 in which the ends of said input and output shaft means inside said housing telescope, and an antifriction bearing disposed between the telescoping ends of said input and output shafts in supporting relation thereto.

3. A floor working machine according to claim 2 in which each of the antifriction bearing means in said bosses comprises a pair of axially spaced antifriction elements, said motor shaft being journalled in the adjacent one of the said antifriction elements in the boss pertaining to said input shaft means, said input shaft means also comprising a shaft member journalled in the other one of said antifriction elements in said boss pertaining to said input shaft means, said shaft member being keyed to said motor shaft to receive driving power therefrom and being integral with the end of said input shaft means which telescopically engages the output shaft means.

4. A floor working machine according to claim 3 in which said housing has plate-like end members from which said bosses extend and side wall means integral with and extending axially between said end members, said side wall means having at least one circumferential aperture through which said compound gear can be introduced into said housing and through which said compound gear projects when mounted on said third shaft.

References Cited

UNITED STATES PATENTS

| 2,026,006 | 12/1935 | Wennerstrom | 74—421 |
| 2,164,670 | 7/1939 | Thomas | 74—421 |
| 3,232,133 | 2/1966 | Hornschuch | 74—421 |

DONLEY J. STOCKING, *Primary Examiner.*

DAVID J. WILLIAMOWSKY, *Examiner.*

L. H. GERIN, *Assistant Examiner.*